United States Patent Office 2,806,835
Patented Sept. 17, 1957

2,806,835

DIISOCYANATE MODIFIED POLYESTER RESIN AND PROCESS OF MAKING SAME

Günther Nischk, Leverkusen-Wiesdorf, and Karl E. Müller, Leverkusen-Bayerwerk, Germany, assignors to Farbenfabriken Bayer Aktiengesellschaft, Leverkusen, Germany, a corporation of Germany No Drawing. Application October 6, 1953,
Serial No. 384,515

Claims priority, application Germany October 14, 1952

3 Claims. (Cl. 260—45.4)

This invention relates to a new process of producing co-polymers.

It is known to co-polymerise unsaturated polyesters with vinyl compounds or polyallyl compounds. The production of these unsaturated polyesters is carried out by thermal esterification of glycols with dicarboxylic acids. Of the unsaturated dicarboxylic acids, maleic acid is of special importance. The unsaturated polyesters thus obtained contain, for the most part, besides maleic acid, varying quantities of dicarboxylic acid devoid of aliphatic unsaturation such as adipic acids or phthalic acids. It has also been proposed to carry out the co-polymerisation of said unsaturated polyesters and vinyl compounds in the presence of saturated polyesters which simultaneously serve as a plasticizer for the co-polymer.

The above polymerisation is generally carried out in the presence of peroxides, for instance benzoylperoxide, at elevated temperature, but according to another proposal the polymerisation is carried out at room temperature by incorporating minor quantities of compounds containing a tertiary nitrogen atom with the unsaturated or saturated polyesters by condensation.

According to the present invention, aliphatically saturated, substantially linear non-polymerisable polyesters of a molecular weight of at least 500, preferably from 500–10,000, are linked by means of isocyanate groups with unsaturated compounds which are capable of yielding co-polymers with vinyl compounds, and the resultant unsaturated addition products are co-polymerised with vinyl compounds. The said unsaturated addition products may be produced by different methods. One method comprises reacting saturated polyesters with a diisocyanate used in excess of the equivalent quantity calculated on the end groups of the polyesters. The resultant intermediate, which carries free isocyanate groups at the ends of the chains, is treated with an unsaturated compound containing at least 2 hydrogen atoms which are capable of reacting with isocyanates, for example hydrogen atoms forming part of COOH, OH or NH₂ groups, the molecule being thus extended. The addition products thus obtained are then co-polymerised with vinyl compounds such as polyallyl compounds.

As starting materials there are employed saturated linear polyesters obtained by esterifying glycols with dicarboxylic acids by conventional methods. These aliphatically saturated linear polyesters may further have incorporated in them components containing a tertiary nitrogen atom. The end groups of the polyesters should preferably consist of hydroxyl groups and the molecular weight should be in the range of between 500 and 10,000.

The linear polyesters thus obtained are reacted with an excess quantity of diisocyanate, calculated on the end groups. Suitable diisocyanates include both aromatic and aliphatic diisocyanates, for instance hexamethylenediisocyanate, toluylenediisocyanate, diphenylmethanediisocyanate and 1.5-naphthylenediisocyanate. The reaction gives rise to compounds containing free isocyanate groups as end groups. Depending upon the degree to which the diisocyanate is present in excess, either the linear polyesters are extended in the reaction or, where the diisocyanate in an excess of 100% over the calculated equivalent quantity is present in the reaction, an addition product which contains 2 terminal free isocyanate groups is obtained. A quantity below an excess of 100% results in a lengthening of the molecule.

The satuated esters containing isocyanate groups obtained as described above are reacted with unsaturated compounds containing at least 2 hydrogen atoms capable of reacting with isocyanate groups and capable of yielding co-polymers with vinyl compounds. Examples of these unsaturated compounds are maleic acid and the low molecular weight bis-diol esters of maleic acid, such as are obtained for instance by re-esterifying 1 mol of dimethylmaleinate with 2 mols of hexane-diol, diethyleneglycol or glycol in known manner. Another unsaturated compound which is suitable for use in the process of the invention is acryldiethanolamide.

The addition products obtained by the above process are co-polymerised with vinyl compounds. Depending upon the composition of the polyester and the proportion of the vinyl components elastic rubber-like, leather-like or rigid vitreous transparent compounds with excellent properties are obtained. For instance the reaction of glycol adipic acid polyester with toluylene diisocyanate and maleic acid-bis-(diethyleneglycolester) followed by co-polymerisation with styrene gives highly elastic products with good mechanical properties. By replacing the adipic acid step-by-step by phthalic acid until finally pure glycol phthalic acid polyesters are employed, first leather-like and finally rigid products are obtained.

The new process is distinguished from the previously known, above mentioned methods in that it allows of producing leather-like and elastic rubber-like products with good mechanical properties and rigid materials of substantially improved mechanical properties. The cause of these advantages is the regular construction of the linear unsaturated polyesters, in which, as already mentioned above, the double bonds are distributed over the chain at equal intervals.

Consequently, a regular net work (cellular structure) is also obtained on co-polymerisation with vinyl compounds. The regular construction is of special importance for the properties and quality of the end products.

The invention is further illustrated by the following examples, the parts being by weight.

Example 1

1000 parts of a polyester, prepared in conventional manner from 1 mol of adipic acid and 1 mol of glycol and having the hydroxyl number 61 and the acid number 1.8, are dehydrated in vacuo at 120–130° C. for one hour. 172 parts of hexamethylenediisocyanate are added at 120° C., the temperature is allowed to rise due to the ensuing exothermic reaction and to drop again to 120° C.; the reaction should be completed in a total of 30 minutes. Thereupon 176 parts of maleic acid-bis-(diethyleneglycolester) are added at 120° C. A slight increase in temperature occurs. After 20 minutes 1 part of hydroquinone and 575 parts of styrene are added at 110° C., the mixture is further stirred and then forced out of the reaction vessel.

After cooling a viscous liquid is obtained, which is stirred with 1% of benzoylperoxide at 80° C. and polymerised at 100° C. A highly elastic polymer is thus obtained.

Example 2

1000 parts of the polyester described in Example 1 are dehydrated as described in Example 1 and reacted with 190 parts of toluylenediisocyanate at 120° C. After stirring for 30 minutes 186 parts of maleic acid-bis-(diethyleneglycolester) are added, the mixture is stirred for another 20 minutes and 1 part of hydroquinone and 585 parts of styrene are added. After stirring well the mixture is forced out of the reaction vessel and polymerised with 1% of benzoylperoxide at 100° C. A rubber-elastic product is obtained.

*Example 3*

200 parts of a polyester obtained from 4 mols of adipic acid, 1 mol of phthalic anhydride and 5 mols of glycol by thermal esterification and having the hydroxyl number 100 and the acid number 0.5, are dehydrated in conventional manner and reacted with 62 parts of toluylenediisocyanate at 120° C. After stirring for 30 minutes 60 parts of maleic acid-bis-(diethyleneglycolester) are added, the mixture is stirred at 120° C. for another 20 minutes and 0.1 part of hydroquinone and 135 parts of styrene are added. After polymerising with 1% of benzoylperoxide at 100° C. a semielastic product is obtained.

*Example 4*

200 parts of a polyester obtained from 2 mols of adipic acid, 1 mol of phthalic anhydride and 3 mols of glycol by thermal esterification and having the hydroxyl number 121 and the acid number 0.5, are dehydrated in conventional manner and reacted with 76 parts of toluylenediisocyanate at 120° C. for 30 minutes. Thereupon 74 parts of maleic acid-bis-(diethyleneglycolester) are added, the mixture is stirred at 120° C. for another 20 minutes and 0.2 part of hydroquinone and 145 parts of styrene are added.

After good stirring the mixture is polymerised with 1% of benzoylperoxide at 100° C. A leather-like co-polymer is thus obtained.

*Example 5*

200 parts of a polyester prepared from 1 mol of adipic acid, 1 mol of phthalic anhydride and 2 mols of glycol and having the hydroxyl number 132 and the acid number 0.5, are dehydrated and reacted with 82 parts of toluylenediisocyanate in conventional manner. After completion of the reaction 85 parts of maleic acid-bis-(diethyleneglycolester) are added, the mixture is stirred at 120° C. for another 20 minutes and 0.2 part of hydroquinone and 150 parts of styrene are added. The copolymer prepared therefrom with 1% of benzoylperoxide is of rigid consistency.

*Example 6*

800 parts of a polyester prepared from 1 mol of phthalic anhydride and 1 mol of glycol and having the hydroxyl number 130 and the acid number 1.1, are dehydrated in conventional manner and reacted with 328 parts of toluylenediisocyanate at 120° C. After good stirring for 30 minutes 300 parts of maleic acid-bis-(diethyleneglycolester) are added, the mixture is stirred at 120° C. for another 15 minutes and 1 part of hydroquinone and 610 parts of styrene are added.

Polymerisation is carried out at 100° C. after addition of 1% of benzoylperoxide. The co-polymer obtained is completely rigid. It is leather-like at 60° C. and can be bent without breaking.

*Example 7*

400 parts of a polyester prepared from 146 parts of adipic acid and 115 parts of diglycol by esterification, which has the acid number 2 and the hydroxyl number 56, are dehydrated in vacuum. 52 parts of toluylenediisocyanate are added at 130° C. and the reaction mixture is heated at this temperature for another 30 minutes. 100 parts of a diglycolmaleate are added, which is obtained by reesterifying 288 parts of dimethylmaleate and 130 parts of diglycol (molecular weight 478) and the mixture is heated at 120° C. for another 30 minutes. 0.4 part of hydroquinone and 240 parts of styrene are then added.

1% of di-tertiary-butylperoxide is introduced into the above copolymerisable solution which is heated to 100° C. for several hours. The finished copolymer is elastic and shows a yellow coloration.

*Example 8*

500 parts of an adipic acid diethyleneglycol polyester of the hydroxyl number 56 and the acid number 0.7 are dehydrated in vacuum at 130° C. and then reacted at 120° C. with 180 parts of an addition product of 2 mols of toluylenediisocyanate and 1 mol of a low molecular weight polyester prepared by reesterifying 2 mols of dimethylmaleate and 3 mols of diglycol (mean molecular weight 480). The temperature is allowed to rise to 130° C. and the mixture is stirred for another 30 minutes; 0.5 part of hydroquinone is added and 300 parts of styrene are run in at 120° C. After good stirring 20 parts of benzoylperoxide are added to the mixture which is heated to 100° C. for 12 hours. An elastic polymer of good mechanical properties is obtained.

We claim:
1. A process for the production of polyester copolymers which comprises reacting (A) an isocyanate-modified polyester of a molecular weight at least 500, prepared by reacting a saturated dihydric alcohol and a dicarboxylic acid reactant devoid of aliphatic unsaturation, followed by condensation with an excess of organic diisocyanate, with (B) an organic compound capable of undergoing polymerization reactions and containing at least one active ethylenic double linkage and at least 2 hydrogen atoms capable of reacting with isocyanates to thereby produce an unsaturated polyester, and condensing said unsaturated polyester with styrene to form a copolymer.

2. Process in accordance with claim 1, in which said organic compound containing at least one active double linkage capable of undergoing polymerization reactions and at least two hydrogen atoms capable of reacting with isocyanates is a member selected from the group consisting of maleic acid, low molecular weight aliphatic dihydric alcohol esters of maleic acid and acrylic acid diethanol amide.

3. Products produced by the process of claim 1.

References Cited in the file of this patent
UNITED STATES PATENTS

| | | |
|---|---|---|
| 2,577,281 | Simon et al. | Dec. 4, 1951 |
| 2,639,252 | Simon et al. | May 19, 1953 |

OTHER REFERENCES

Powers: Synthetic Resins and Rubbers, page 37, Wiley and Sons, New York, 1943.